Fig. 17

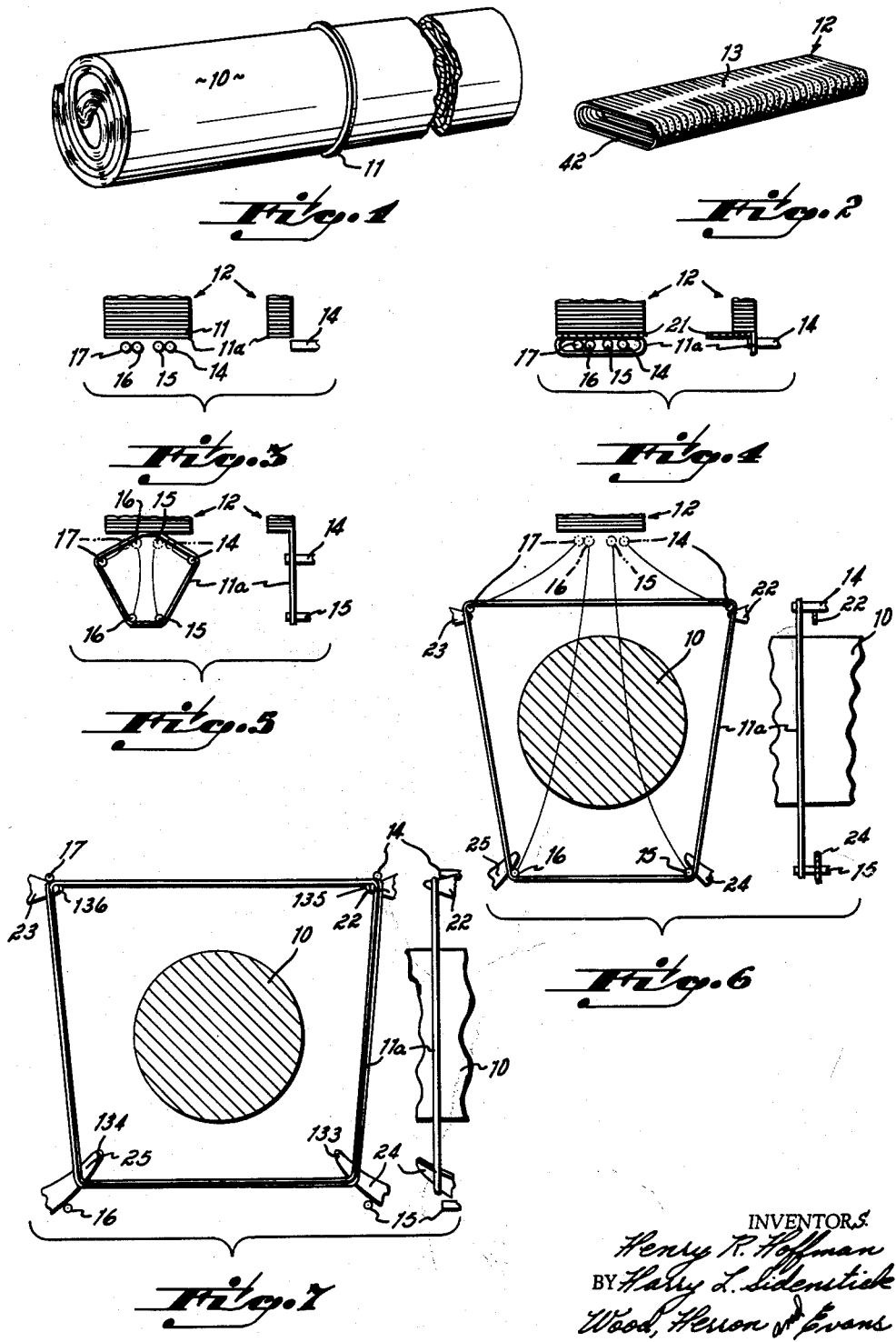
June 1, 1965 H. R. HOFFMAN ETAL 3,186,333
RUBBER BAND STRETCHING APPARATUS
Filed Nov. 1, 1963 9 Sheets-Sheet 1
INVENTORS
Henry R. Hoffman
BY Harry L. Sidenstick
Wood, Herron & Evans
ATTORNEYS

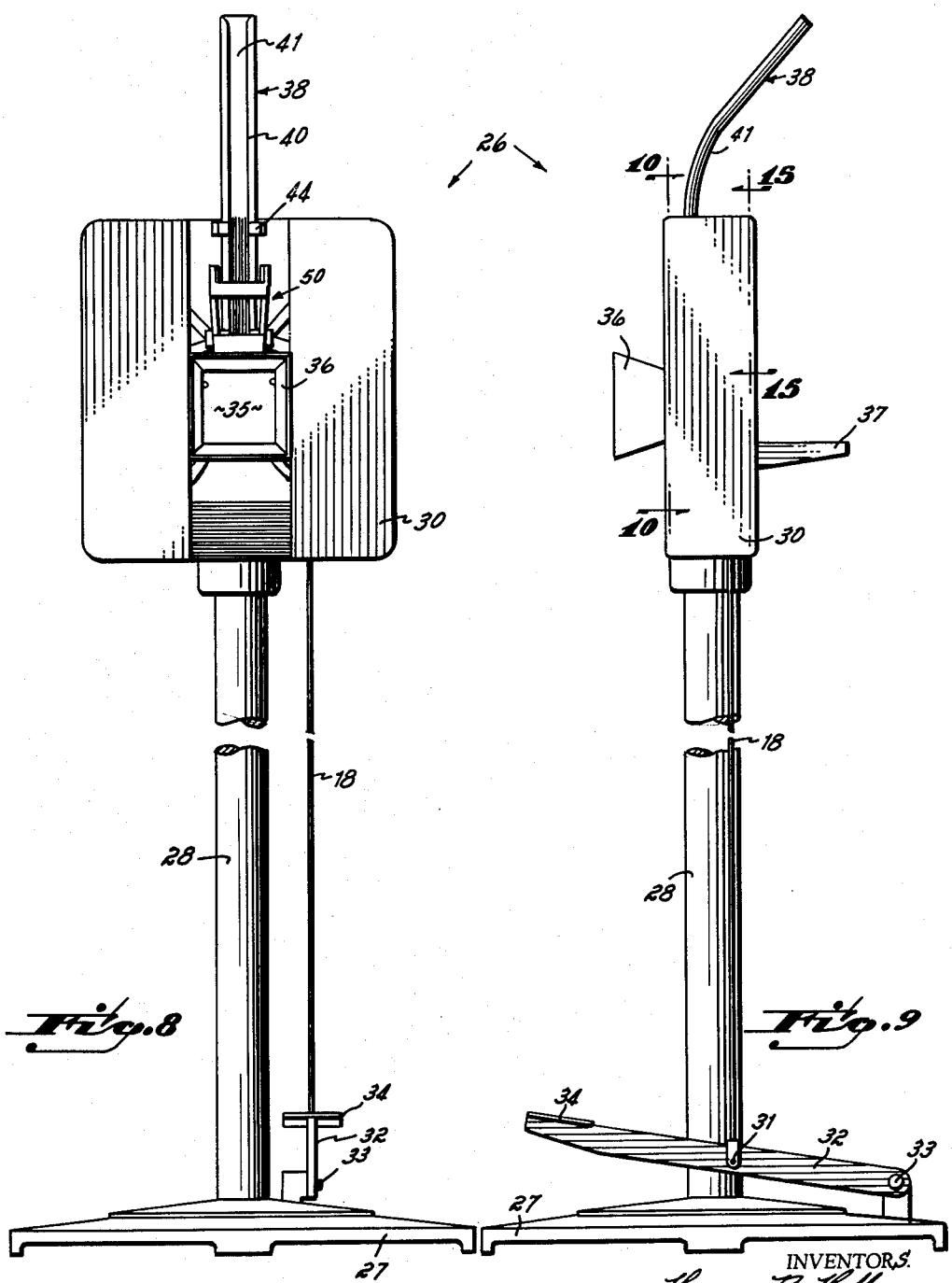

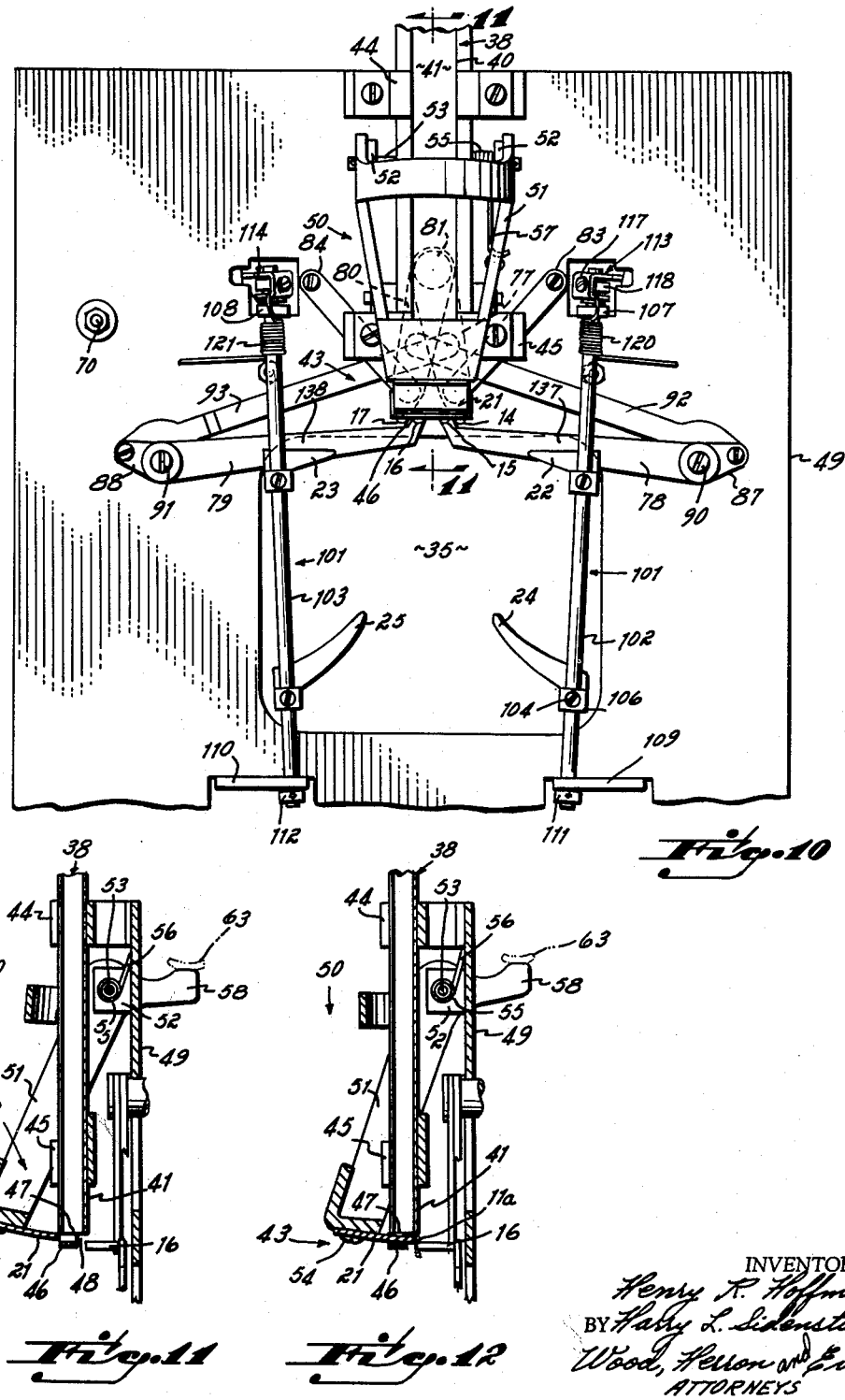

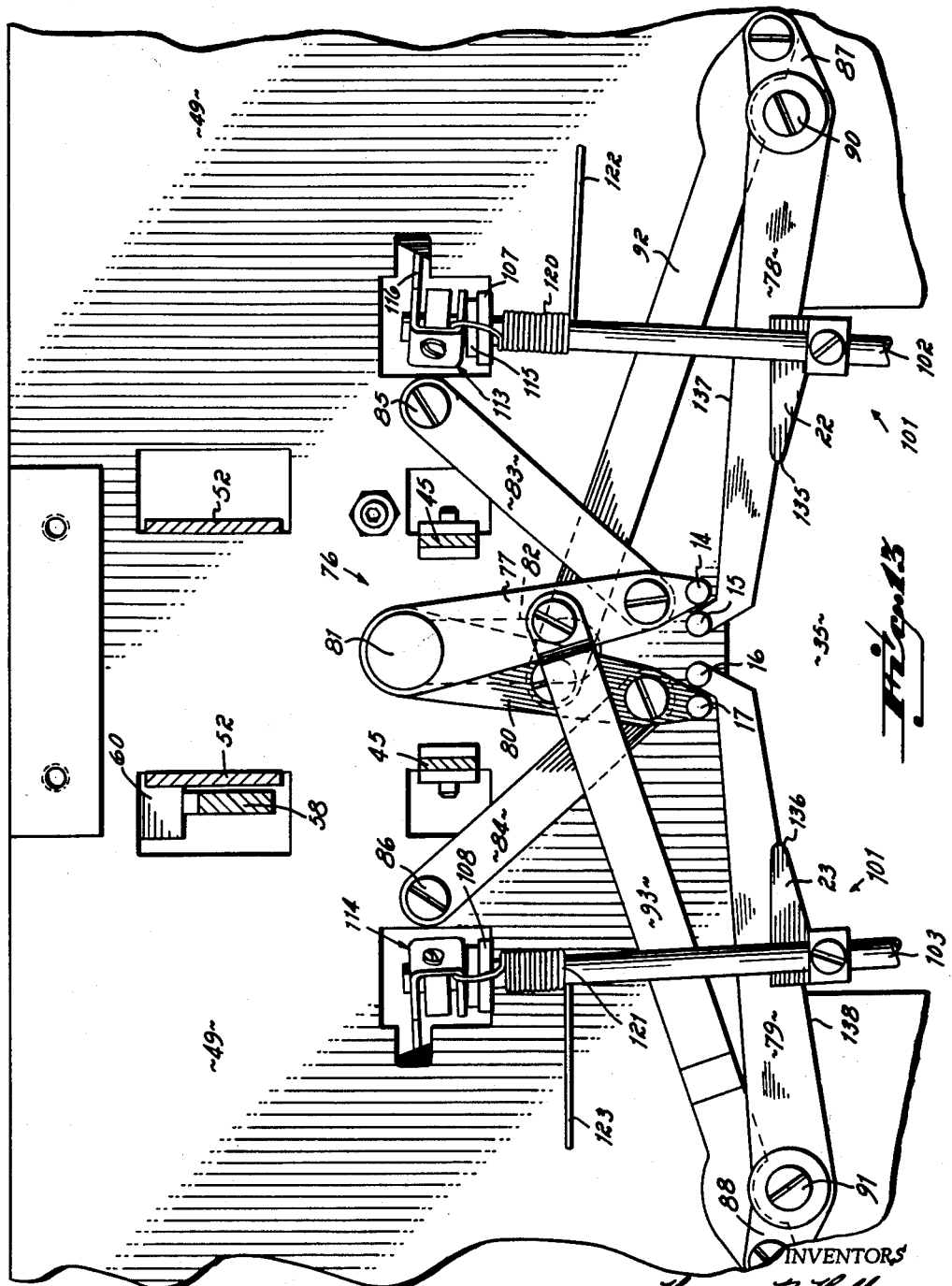

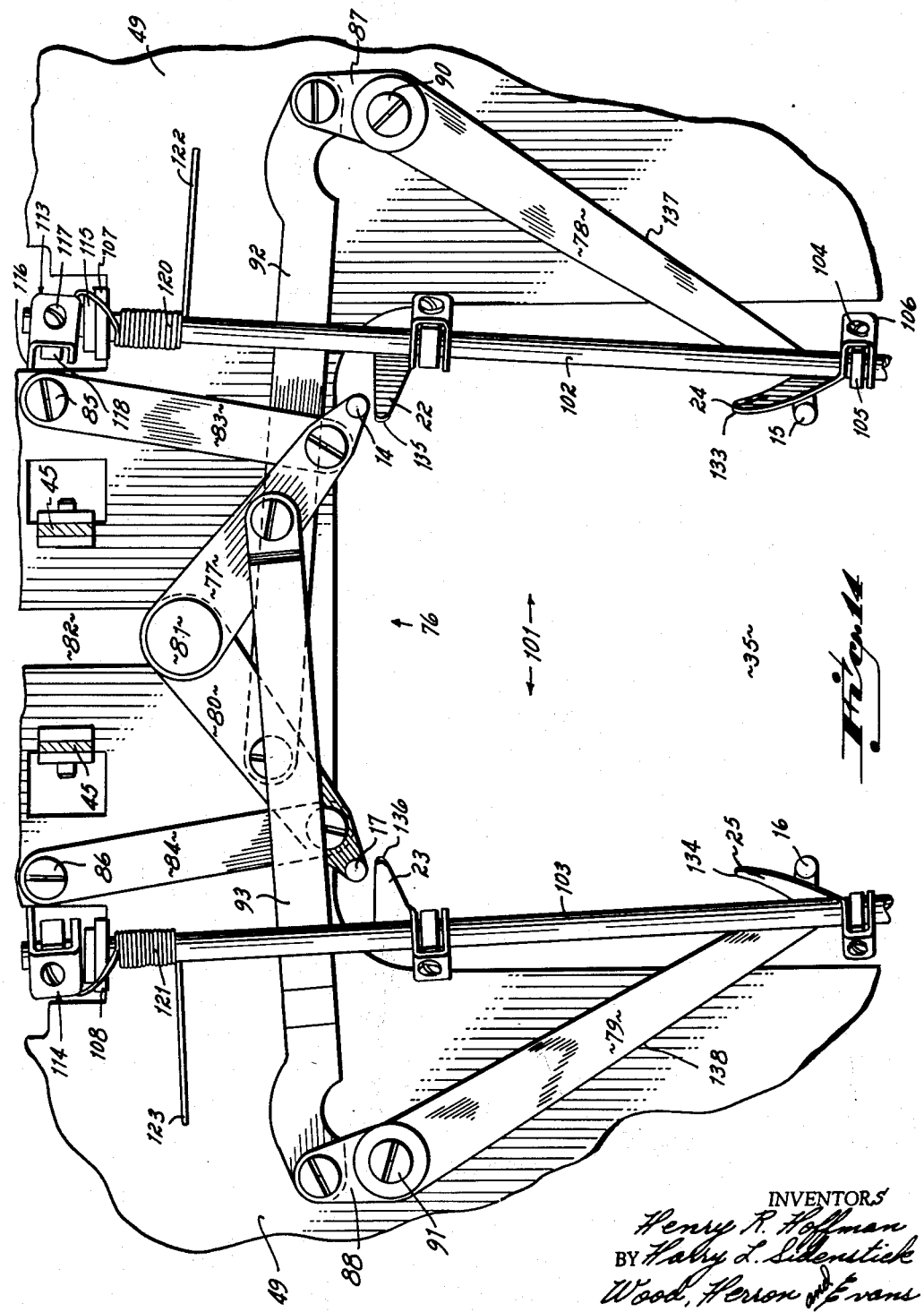

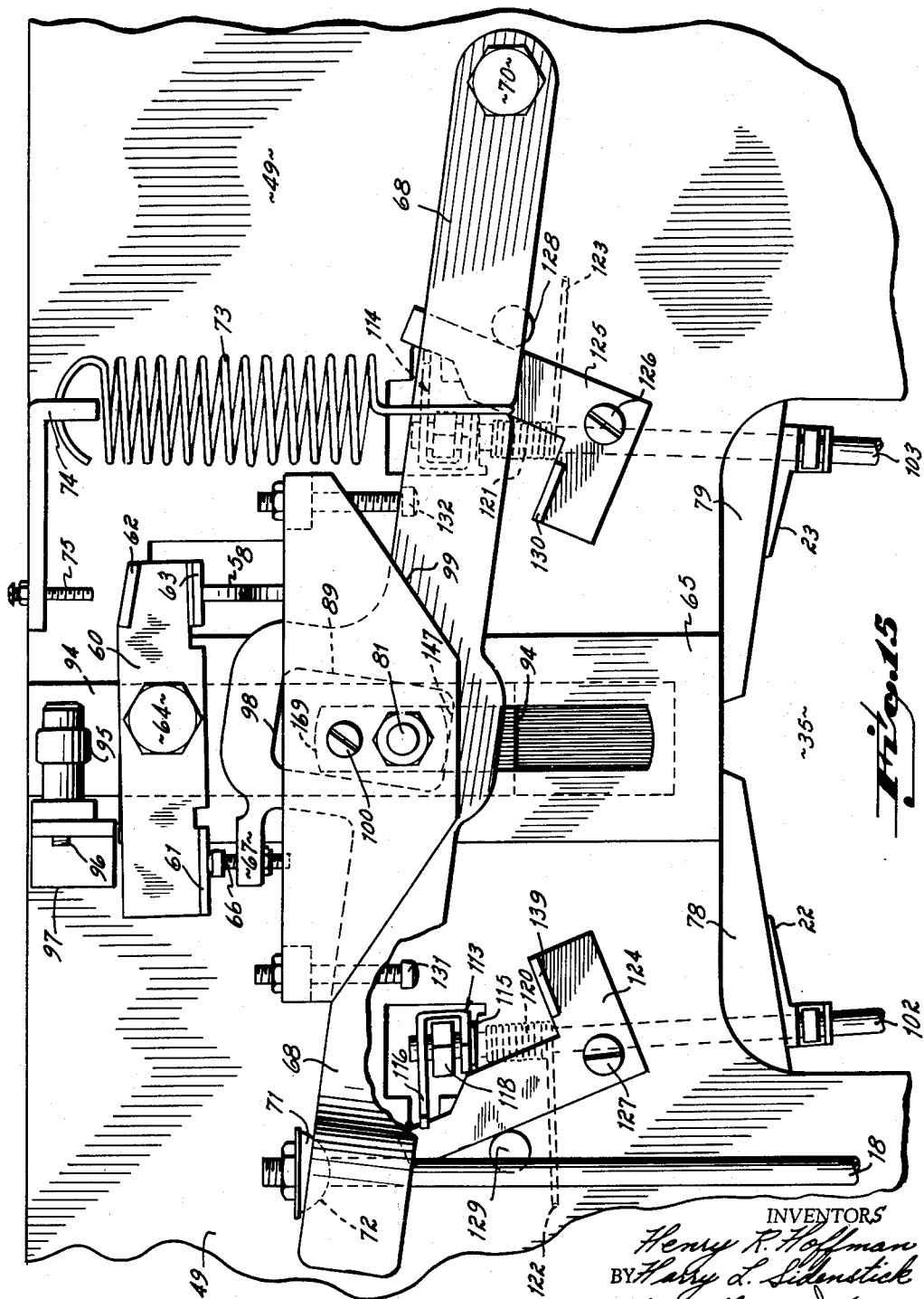

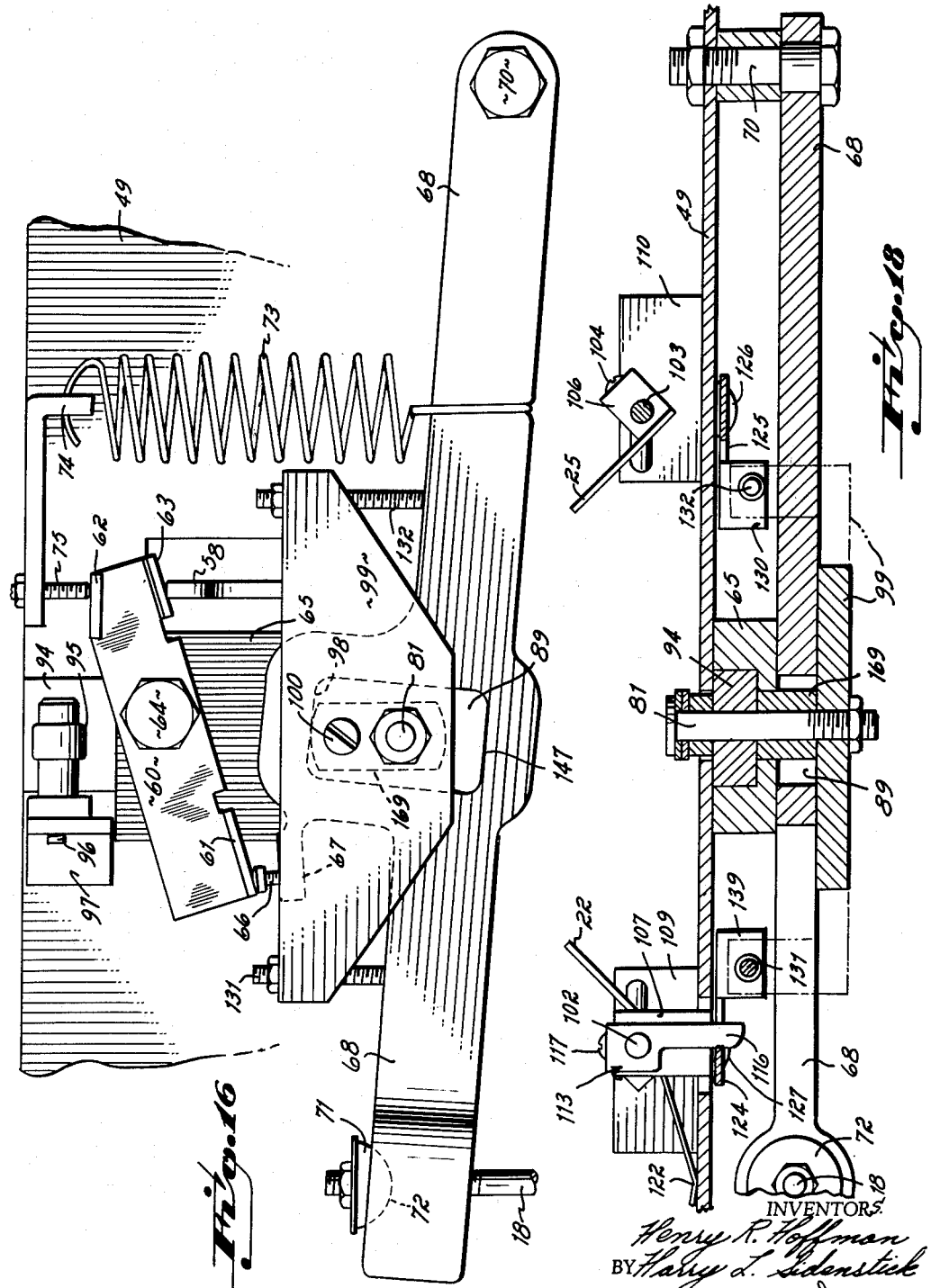

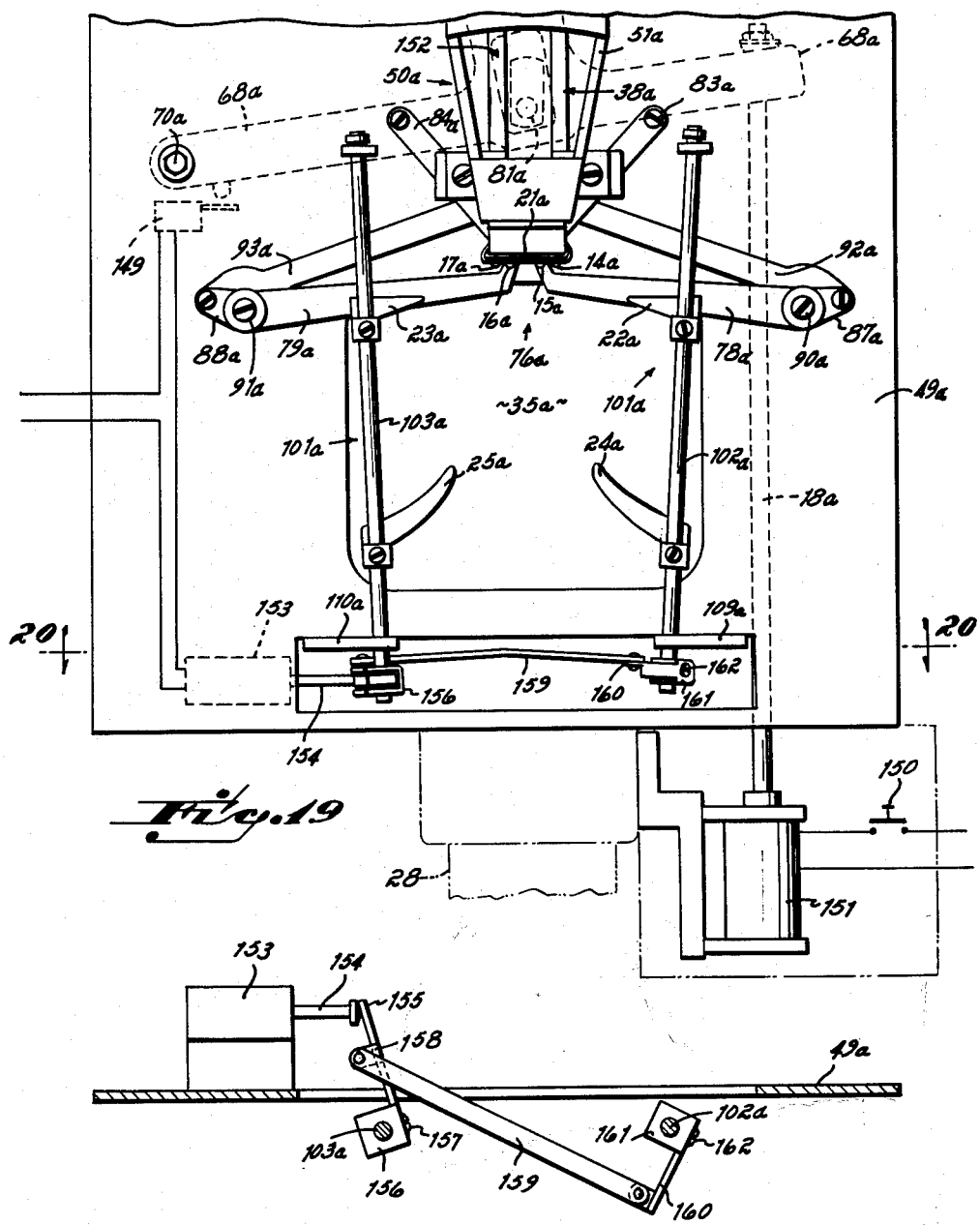

United States Patent Office 3,186,333
Patented June 1, 1965

3,186,333
RUBBER BAND STRETCHING APPARATUS
Henry R. Hoffman and Harry L. Sidenstick, Cincinnati,
Ohio, assignors to Kett Tool Co., Cincinnati, Ohio, a
corporation of Ohio
Filed Nov. 1, 1963, Ser. No. 320,631
16 Claims. (Cl. 100—9)

This invention relates broadly to packaging and wrapping equipment and is particularly directed to a device for wrapping elastic bands, such as rubber bands, around an article.

The principal object of the present invention is to provide a machine adapted to store a plurality of rubber bands, sequentially separate each band from the remainder, stretch the separated band to form a large central opening and, finally, to release the separated band so that it snaps around an article which has been inserted within the opening. A band applying machine of the present invention is effective to perform these operations automatically in response to either the mechanical actuation of a single member, such as a foot peddle or handle, or the actuation of an electrical switch. Thus, the present apparatus provides a ready means for wrapping rubber bands around articles at a high rate of speed with a minimum of effort on the part of the operator, or indeed no attention at all if the machine is installed as part of an automatic conveyor and wrapper system.

The present machine is particularly adapted for use with a tubular rubber band assembly, although it is to be expressly understood that the machine is not limited to the specific rubber band assembly described below. One preferred form of rubber band assembly which can be used in the present machine comprises an elongated tubular aggregation of adherent rubber bands. The tubular assembly is of oval configuration and is provided with a plurality of parallel, transverse cuts delineating individual rubber bands. The tube is not completely severed about its periphery, however, so that adjacent bands are held together by a thin, uncut strip extending parallel to the axis of the tube.

A preferred embodiment of the present band applying machine comprises a curved, generally vertical feed chute in which one or more of these tubular rubber band assemblies is stored. A support element, or shelf, is spaced from the lower end of the chute and is positioned to engage at least a portion of the bottom surface of the lowermost band. The machine further includes a feeding mechanism for engaging the lowermost rubber band and feeding it to an expander mechanism.

The expander mechanism of the present machine comprises four expander fingers which are initially disposed in close proximity to one another to receive the rubber band which is forced over the fingers in an unstretched condition by the feeder mechanism. Means are provided for shifting the expander fingers until they occupy the corners of a quadrilateral. While the exact configuration of this quadrilateral may vary depending on the shape of the article to be wrapped, we have found that one very satisfactory configuration is that of a square, or a trapezoid approaching a square. When the expander fingers are shifted to this latter position, the rubber band is stretched to form a large central opening. In practice, the operator manually inserts the article to be wrapped into the central opening, or alternatively an article can be automatically fed by a conveyor or the like.

The present apparatus further includes a release mechanism effective to disengage the rubber band from the expander fingers allowing it to snap over the article being wrapped. In the preferred embodiment of the machine, this release mechanism comprises a plurality of release fingers which are shifted in a plane transverse to the plane of the rubber band near the end of the operating cycle. These release fingers push the band from the ends of the expander fingers and allow it to contract about the article being wrapped.

One of the principal advantages of the present rubber band applying machine is that bands can be wrapped around a series of articles at a rapid rate, for example sixty a minute.

Another object of the present machine is that the wrapping can be accomplished by an operator having little or no skill or dexterity. The feeding, stretching and release of the rubber bands are all accomplished automatically in timed succession in response to the mere depression of a foot peddle, pull of a hand lever, press of a button or the like.

Still another advantage of the present invention is that the band can be placed in any desired position along the length of the article. The operator can select this position at will be merely controlling the length of the article inserted in the machine.

Still another advantage of the present machine is that it is of relatively simple and durable construction. Consequently, the machine can be utilized in installations where a large capital expenditure is not justified and also in installations where reliability is of considerable importance.

Among the other advantages of the present invention is the provision of a feed chute which prevents improper loading of the tubular band assembly. More particularly, the present machine requires for its operation that the bands be inserted in a particular orientation. In accordance with the present invention, the feed chute is of generally oval outline to conform to the cross sectional configuration of the tube. Moreover, the axis of the feed chute is curved. We have determined that this curvature provides a ready means for warning the operator that the bands are improperly inserted. Specifically, the tubular band assembly can be bent rearwardly along the uncut strip. However, the tubular assembly cannot readily be bent in the opposite direction. Thus, if the uncut portion is properly oriented in the feed chute, the bands can easily be inserted and will readily follow the curved contour of the chute. However, if the operator attempts to insert the bands in the wrong orientation, the tube resists bending in conformity with the chute and the operator is given a clear indication that the rubber band tube is not properly positioned.

Still another object of the present invention is to provide a mechanism for feeding rubber bands from the chute to the expander fingers. In the present machine this is accomplished by orienting the expander fingers so that in their retracted or starting position they extend transversely of the bottom of the chute. In their retracted position, these fingers are juxtaposed and are preferably oriented in a straight line extending parallel to and beneath the lowermost rubber band of the tube. It is one of the important concepts of the present invention that the lowermost band can be placed over the expander fingers by pushing against the periphery of the band in a transverse direction toward the uncut strip so that the band pivots about the uncut strip into a plane parallel to the tube axis. In this pivotal motion, the band passes over the four expander fingers and is firmly gripped by these fingers when they begin their divergent movements.

It is another object of the present invention to provide a ready means for sequentially detaching each band from the remaining bands of the tubular assembly. In this regard, one important determination of the present invention is that the severing can be accomplished as a concomitant of the stretching, or expanding, operation without the need of any separate severing mechanism. In other words, in the present machine when the expander fingers stretch the band they also are effective to pull the band from the next adjacent band of the tube.

Still another advantage of one preferred form of band applying machine constructed in accordance with the present invention is that the feeding mechanism, expander mechanism and release mechanism are all actuated in response to the movement of a single, reciprocating actuating rod. This actuating rod is shifted by a handle, foot peddle or the like. As a result, the timed movements of the various mechanisms can be accurately synchronized without resort to complex mechanisms.

These and other objects and advantages of the present invention will be more readily apparent from the following detailed description of the drawings illustrating a preferred embodiment of the present invention.

In the drawings:

FIGURE 1 is a perspective view showing a typical rolled article encircled by a rubber band.

FIGURE 2 is a perspective view of a tubular stack of rubber bands for use with the present apparatus.

FIGURE 3 is a diagrammatic front and side view of a stack of rubber bands showing the position in which the bands are supported above the movable expander fingers of the present machine at the beginning of an operating cycle.

FIGURE 4 is a diagrammatic front and side viewing showing the manner in which the lowermost band is pivoted downwardly over the expander fingers by the feeder blade.

FIGURE 5 is a diagrammatic front and side view showing the manner in which a rubber band is initially expanded and torn from the stack by outward movement of the expander fingers.

FIGURE 6 is a diagrammatic front and side view showing the paths of movement of the expander fingers as the band is stretched to an intermediate position.

FIGURE 7 is a semi-diagrammatic front and elevational view showing the manner in which the band is released from the expander fingers to snap around the article.

FIGURE 8 is a front elevational view of one form of machine constructed in accordance with the principles of the present invention.

FIGURE 9 is a side elevational view of the machine shown in FIGURE 8.

FIGURE 10 is a cross sectional view taken along the line 10—10 of FIGURE 9.

FIGURE 11 is a cross sectional view taken along the line 11—11 of FIGURE 10.

FIGURE 12 is a cross sectional view showing the band engaging feeder blade in an advanced position.

FIGURE 13 is a front elevational view of the expanding mechanism in its retracted or initial band receiving position.

FIGURE 14 is a front elevational view of the expanding mechanism showing the expander arms in their extended position.

FIGURE 15 is a cross sectional view taken along the line 15—15 of FIGURE 9 showing the actuating linkage for shifting the expander arms, advancing the blade and pivoting the release fingers, the mechanism being shown in its starting position.

FIGURE 16 is an enlarged, partial cross sectional view similar to FIGURE 15 showing the actuating mechanism at an early point in the cycle in which the feeder blade has advanced against the bands, but the expander fingers have not yet been shifted.

Figure 17:
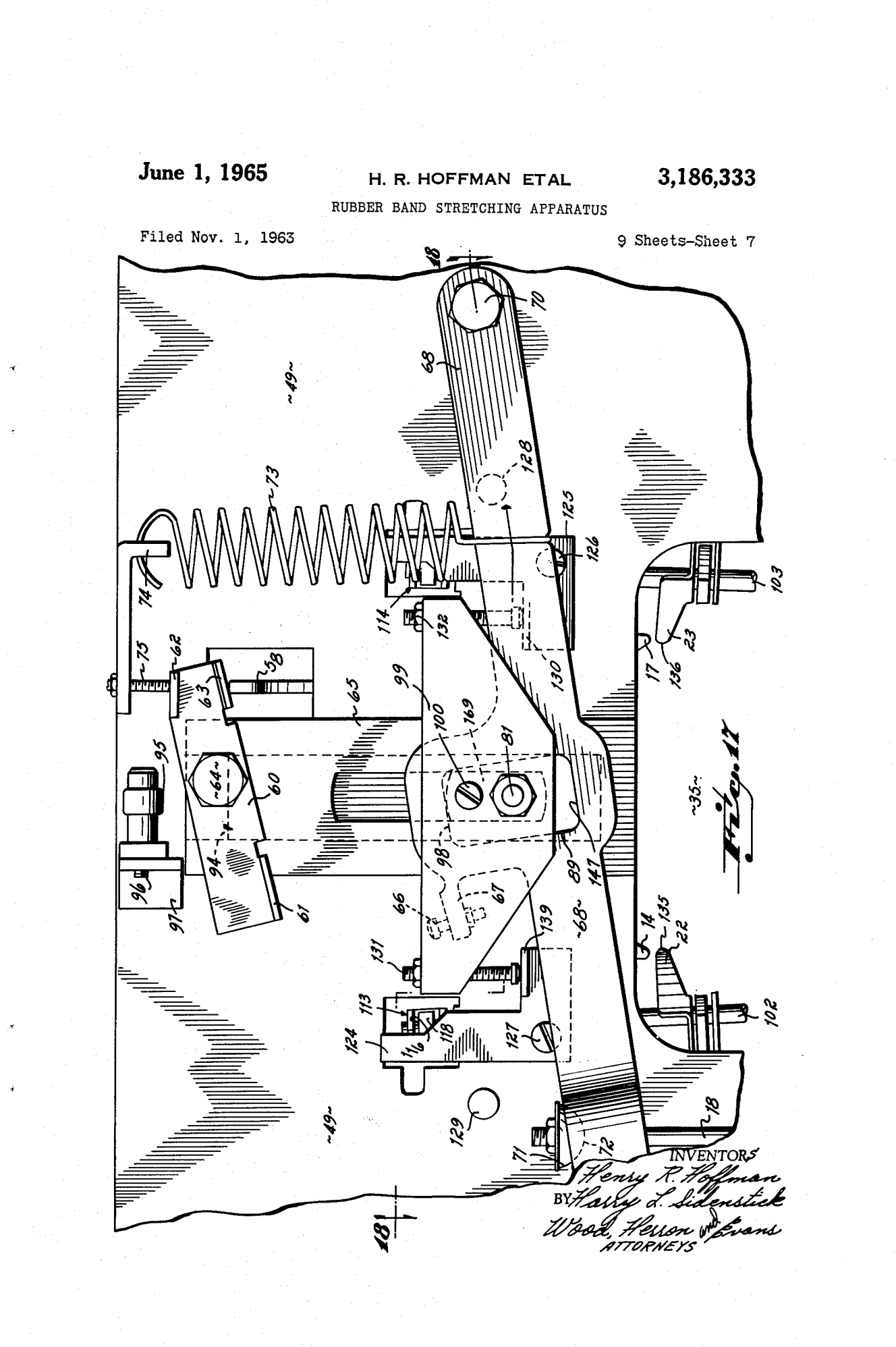

FIGURE 17 is a view similar to FIGURE 15 showing the actuating mechanism at the extreme limit of its advance at the end of the operating cycle.

FIGURE 18 is a cross sectional view taken along the line 18—18 of FIGURE 17.

FIGURE 19 is a front elevational view of a modified form of machine which is solenoid operated.

FIGURE 20 is a cross sectional view of the modified machine taken along line 20—20 of FIGURE 19.

The general principles of operation of the present machine can best be appreciated from a consideration of FIGURES 1–7. In these figures, FIGURE 1 shows a typical article 10 over which has been snapped a rubber band 11 using the present machine. It is to be understood that article 10 may be any type of article about which it is desired to place a rubber band, for example a coiled newspaper, a wrapped commodity or the like. It is also to be understood that resilient bands formed of plastic or the like can be used with the present machine in place of bands formed of rubber. However, to provide a clearer understanding of the present invention, the machine will be described with respect to one particular type of rubber band with which the machine is used most advantageously.

The rubber bands used in the present machine are initially supplied in tubular form as is shown in FIGURE 2. As there shown, the tube of rubber bands 12 comprises an elongated aggregation of bands which are oval in shape and are substantially severed from one another. However, each adjacent band is joined to the next adjacent band by a thin uncut area. This uncut area, indicated generally at 13 in FIGURE 2, constitutes a strip extending longitudinally of tube 12 parallel to the tube axis, and adjacent to the middle of one flat side of the oval shaped tube.

As is shown in FIGURE 3, the tube of rubber bands 12 is inserted in the present machine so that the axis of the tube extends in a generally vertical direction with the individual rubber bands 11 extending generally horizontally. It is to be understood that the uncut strip portion 13 is disposed to the rear of the tubular assembly as viewed in the front elevational view of FIGURE 3 and to the right as viewed in the side elevational view of FIGURE 3. The lowermost edge of the tube of bands is supported above the fingers 14–17 by means of a shelf member as is explained in detail below. It is to be understood that the article to be wrapped with the band is not inserted in the machine until a later time.

At the beginning of the cycle of operation, an actuating rod 18 (FIGURE 8, not shown in FIGURES 1–7) is depressed in any suitable manner, such as by means of a hand lever, foot peddle, solenoid or the like. In the manner explained below, initial movement of this actuating rod causes feeder blade 21 to be advanced into contact with the lowermost band 11a of the tube. Engagement of blade 21 with the lowermost band 11a causes that band to become disengaged from the support shelf and to pivot downwardly and rearwardly with the uncut portion 13 of the band serving as a hinge, or fulcrum point. As the band 11a is pivoted downwardly, it passes over the four expander fingers 14–17 which are disposed closely adjacent to one another in a horizontal line beneath the lowermost band.

In the next portion of the operating cycle, further shifting movement of the actuating rod 18 causes the expander fingers 14–17 to be shifted apart to the intermediate position shown in FIGURE 5. As is shown in FIGURE 5, the two outermost fingers 14 and 17 are pivoted downwardly and outwardly with the major component of their movement being in a horizontal direction. Simultaneously, the two innermost fingers 15 and 16 are shifted downwardly and outwardly with the major component of their movement being downwardly. As these fingers are shifted, they stretch the rubber band and cause it to be torn or severed from the tube 12. The rubber band 11a is the entirely supported upon the four fingers 14–17, while the tube 12 is held above the mechanism by the feed blade.

In the intermediate segment of the operating cycle, the four expander fingers 14–17 are shifted further apart stretching the band 11a a substantial amount and forming a large central opening. As shown in FIGURE 6, in this position the four expander fingers 14–17 are disposed at the corners of a trapezoid which approaches a rectangle. At this time, the rubber band is stretched larger than the periphery of the article 10 about which it is to be snapped. The article can thus be inserted within the band at this point in the cycle. The present machine also includes four release fingers for disengaging the band from the expander fingers. As shown in FIGURE 6, the four release fingers 22–25, which are normally disposed adjacent to the rear ends of the expander fingers, are advanced slightly toward the forward, or free, ends of the expander fingers 14–17 before the expander fingers reach their most advanced position. In FIGURE 6, however, the release fingers 22–25 are still spaced rearwardly of rubber band 11a.

As actuating rod 18 is advanced at the end of the stroke, the outward movement of expander fingers 14–17 continues, and release fingers 22–25 continue to move forwardly engaging rubber band 11a and forcing that band off of the free ends of expander fingers 14–17. The release fingers 22–25 are of a curved and angulated configuration, as is explained in detail below, so that the band does not remain in engagement with these fingers but rather slips from engagement with them and snaps over the article 10 in the manner shown in FIGURE 1. As the final step of the operating cycle, the article 10 is removed from the machine and the actuating rod is released so that the mechanism is returned to its starting position ready for the commencement of another operating cycle.

The details of one suitable form of machine for stretching rubber bands in the manner described above are shown in FIGURES 8–18. As there shown, the rubber band stretching machine 26 comprises a base member 27 supporting an upright column 28, the column having mounted thereon a housing 30. The housing supports and encloses all of the operating mechanism of the device except for actuating rod 18 which is connected as at 31 to a treadle lever 32. The rear end of this lever is pivotally mounted upon the base as at 33 while the front end of the lever carries a foot peddle portion 34.

It is to be understood that when the lever is depressed, actuating rod 18 is pulled downwardly and when lever 32 is released the actuating rod returns upwardly to its original position under spring force. It is also to be understood that the foot peddle can be eliminated and the mechanism operated by a hand lever if desired. Alternatively, the device can be electrically operated in the manner shown in FIGURES 19 and 20, or can be powered by means of pneumatic or hydraulic cylinders.

As is shown in FIGURES 8 and 9, housing 30 is provided with an opening 35 which extends completely through the housing and is adapted to receive the article about which a rubber band is to be encircled. At the front of the housing, opening 35 is surrounded by a guide tube 36 while at the rear of the housing a shelf member 37 is mounted beneath the opening 35 to receive articles after they have been wrapped with a rubber band.

A feed chute 38 is provided for storing and supporting one or more tubes of rubber bands 12 in a position in which the bands can be serially fed to the expander fingers. As is best shown in FIGURES 8, 9 and 10, feed chute 38 is of a generally oval cross section slightly larger than the cross section of the bands. The chute includes a front slot 40 to provide access space to at least the lowermost band in the tube. Also, as is shown in FIGURE 9, feed tube 38 is preferably curved slightly toward the rear of the machine.

This curvature provides a double function. In the first place, it reduces the downward pressure on the lowermost band to facilitate removal of that band. Even more importantly, however, the curvature of the tube provides a positive guide for the operator to make certain that the tube of rubber bands is properly inserted in the machine. Specifically, for proper functioning of the present machine the tubes 12 must be inserted with the uncut strip 13 disposed at the rear of the machine, i.e. against flat rear wall 41 of the feed tube. The present feed tube, with its rearward bend, utilizes the property of the tube of rubber bands that it will easily bend rearwardly along the uncut strip 13, but cannot readily be bent forwardly from that strip.

Specifically, as viewed in FIGURE 2, if the right-hand edge of the tube 12 is held stationary, the forward edge 42 of the tube can be bent upwardly but cannot be bent downwardly without obviously disarranging the bands. Thus, an operator can readily place a tube of rubber bands in feed tube 38 with the uncut strip 13 along rear wall 41. However, when the operator attempts to force a tube of bands downwardly within the feed tube after the bands have been improperly inserted with the uncut strip 13 in registry with slot 40, the bands tend to jamb within the tube providing an obvious indication that the rubber band tube has been improperly loaded.

The lowermost end of feed chute 38 terminates at feeding station 43. The details of feeding station 43 are best shown in FIGURES 10–12. As is there shown, the lower end of feed chute 38 is mounted to a vertical divider wall 49 disposed within the housing by means of brackets 44 and 45 which are bolted or otherwise secured to the divider wall. Bracket 45 also supports a U-shaped shelf member 46. This shelf member is spaced below the lower edge 47 of feed chute 38 by a distance slightly greater than the width of one rubber band. The shelf extends from the forward edge of the chute only a fraction of the distance toward the rear wall 41. As a result, a clearance space 48 is provided for enabling a rubber band to be pushed rearwardly over the shelf and pivoted downwardly over the expander fingers 14–17 as is shown in FIGURE 12. It is to be understood that the tube of rubber bands 12 slides freely within feed chute 38 so that the lowermost rubber band of the tube rests upon shelf 46.

The feed mechanism for feeding the lowermost band onto the expander fingers is indicated generally at 50. Specifically, as is shown in FIGURES 10-12, this feed mechanism includes a yoke member 51 pivotally secured at its upper end to flanges 52 provided by vertical wall 49. The upper ends of the yoke are mounted upon an elongated pivot pin 53 which extends between aligned openings formed in flanges 52 and the arms of yoke 51. The lowermost end of the yoke carries rearwardly extending feeder blade 21. This blade is preferably formed of sheet steel, or the like, and is secured to the lower edge of the yoke in any suitable manner, such as by means of bolts 54. The feeder blade 21 is disposed to pass between the lowermost end of feeder chute 38 and shelf member 46. In the preferred embodiment, the leading edge of the blade is preferably of concave configuration so that the blade engages an appreciable portion of the periphery of the lowermost band resting on shelf 46.

Yoke 51 is spring urged toward an advanced, or feeding, position with the blade extending beneath the feeder tube as is generally shown in FIGURE 12. Specifically, a spring 55 is coiled around pivot pin 53. One arm 56 of the spring abuts the divider plate 49 while a second arm 57 of the spring engages an opening in an arm of the yoke. At the beginning of the operating cycle, the yoke is held in its retracted position with the feed plate 21 spaced from the edge of chute 38 by means of a linkage including a rearwardly extending arm 58 formed on the upper end of the yoke member. This arm extends rearwardly through an opening formed in the divider wall and, as is best shown in FIGURE 15, is disposed for engagement with a rocker lever 60.

Rocker lever 60 is an elongated lever having a flange 61 formed on the lower surface of one end of the lever and flanges 62 and 63 respectively formed on the upper and lower edges at the opposite end of the lever. Flange 63 is disposed for abutment with the upper surface of arm 58. Rocker lever 60 is pivotally mounted at its center portion upon a pivot pin 64 which is mounted upon a vertically slotted block 65, the block in turn being bolted or otherwise secured to the rear surface of divider wall 49.

Flange 61 of rocker lever 60 is disposed for engagement with an abutment screw 66 which threadably engages a flange 67 formed on main pivot arm 68. Main pivot arm 68 is pivotally mounted at one end on a pivot pin 70 carried by divider wall 49. The opposite end of pivot arm 68 is connected to actuating rod 18 in any suitable manner such as by means of a hemispherical thrust bearing 71 in engagement with a mating bearing surface 72 formed in the end of pivot arm 68. Pivot arm 68 is spring urged upwardly to its retracted, or initial, position by means of a coil spring 73 having its lower end in engagement with the arm and its upper end carried by support member 74. When the main pivot arm 68 is in its upper position as shown in FIGURE 15, abutment screw 66 engages flange 61 and forces the pivot lever 60 to pivot in a clockwise direction as viewed in FIGURE 15. Thus, flange 63 forces arm 58 downwardly and yoke 51 is pivoted outwardly away from the divider wall as is shown in FIGURE 11. It is to be understood that main spring 73 produces a force substantially in excess of that provided by coil spring 55.

However, when the pivot arm 68 is pivoted downwardly, i.e. in a counterclockwise direction as viewed in FIGURE 15, abutment screw 66 is shifted downwardly permitting rocker lever 60 to pivot in a counterclockwise direction as viewed in FIGURE 15. Arm 58 is thus allowed to pivot upwardly under the force of coil spring 55 and feeder blade 21 is advanced beneath the end 47 of feed chute 38 under the force of coil spring 55. As the blade advances, it engages the lowermost band 11a in the chute and causes that band to pivot downwardly about the uncut strip 13. The band is thus forced over the four expander fingers 14–17 disposed beneath the end 47 of feed chute 38 as is shown in FIGURES 11 and 12. It is to be understood that the feed blade 21 advances beyond the position shown in FIGURE 12 to a position in which it overlies the feed fingers and hence forces the lowermost band 11a inwardly an appreciable distance from the ends of the fingers. Inward movement of yoke 51 and feeder blade 21 is limited by the abutment of flange 62 with a stop screw 75 mounted upon a bracket carried by divider wall 49. The blade in this position supports the tube of bands and prevents their being pulled downwardly when the lowermost band is separated as explained below. It will be appreciated that the feed blade 21 is advanced solely by spring force; so that in the case of a jam at the feeding station, the feed mechanism is protected against damage.

In addition to the feed mechanism described above, the present band applying machine comprises an expander mechanism indicated generally at 76. This expander mechanism comprises four expander arms 77–80 which respectively carry at their outer free ends expander fingers 14–17. These fingers extend forwardly from the arms 77–80.

As is best shown in FIGURES 13 and 14, each of the upper expander arms 77 and 80 is pivotally joined to a reciprocating pin 81. This pin, as is explained below, is shifted vertically within a slot 82 formed in block 65 and divider wall 49. Each of the upper arms 77 and 80 is also joined to a link 83, 84. These links are pivotally mounted at their upper ends to pivot pins 85 and 86 carried by divider wall 49. The lower ends of links 83 and 84 are pivotally connected to arms 77 and 80 adjacent to the expander fingers 14 and 17 respectively.

Each of the lower arms 78 and 79 comprises an elongated segment 137, 138 and a short segment 87, 88 angulated slightly relative to the elongated segment. Each of the lower arms is mounted upon a pivot pin 90, 91 at the juncture of the short and long segments of the arm. The pivot pins 90 and 91 are carried by divider plate 49. Arms 78 and 79 are actuated by means of cross links 92 and 93. Link 92 is connected to the free end of short segment 87 and to the mid section of the remote upper arm 80. Similarly, link 93 is connected to the free end of short segment 88 and to the mid section of the remote upper link 77.

As explained above, expander fingers 14–17 are mounted at the free ends of arms 77–80 respectively. These expander fingers are preferably cylindrical in configuration and, as shown in FIGURE 11, extend forwardly to substantially the plane of the feed chute 38. The arms are shifted through a lost motion mechanism including a box-like section including an elongated opening 89 formed on the mid portion of main pivot arm 68. This elongated opening receives reciprocating pin 81. This pin extends rearwardly from arms 77 and 80 through slot 82 in divider wall 49 and slotted block 65. The pin is mounted in a slide block 94 which slides vertically in an undercut vertical groove formed in block 65. Pin 81 is threaded at its rearward end and is bolted to vertically reciprocating wing plate 99. Wing plate 99 also carries a bolt 100 which passes forwardly from the wing plate and carries a camming sleeve 169 disposed within opening 89, the forward end of bolt 100 engaging slide block 94. It is to be understood that pin 81 also passes through camming sleeve 169.

As is shown in FIGURE 15, slide block 94 is disposed to pass between a roller 95 and divider plate 49 when the actuating rod 18 and pivot arm 68 are in their upper or initial position. Roller 95 is mounted on a pin 96 carried by a bracket 97, the bracket in turn being mounted upon divider wall 49. This roller exerts a sufficient frictional force against slide block 94 to frictionally retain that block in its elevated position during the initial "lost motion" movement of the pivot arm 68, i.e. until that arm is shifted downwardly a sufficient distance so that the upper edge 98 of elongated slot 89 engages the cam block 169 carried by bolt 100. Thus, when actuating rod 18 is initially depressed, main pivot arm 68 pivots downwardly from the position shown in FIGURE 15 to the position shown in FIGURE 16. During this time, the feed plate 21 is pivoted rearwardly under the force of coil spring 55 to pivot rubber band 11a downwardly over the four expander fingers 14–17. During this initial movement of the pivot arm, slide block 94 remains in its elevated position due to the frictional force exerted by roller 95. However, after arm 68 has pivoted a sufficient distance to bring upper surface 98 into contact with cam sleeve 169, slide block 94 is shifted downwardly carrying with it pin 81. As pin 81 shifts downwardly from the retracted position shown in FIGURE 13, upper expander arms 77 and 80 are caused to pivot outwardly about their points of connection to links 83 and 84 at the same time, links 83 and 84 pivot outwardly about pins 85 and 86. At the same time, lower arms 78 and 79 pivot downwardly and outwardly about pins 90 and 91. By the time the expander arms reach the limits of their movement, the rubber band is stretched by expander fingers 14–17 into a large trapezoid as shown in FIGURE 14. By this time, the article has been inserted into opening 35 and is thus positioned to receive the band when the band is disengaged from the expander fingers.

The function of releasing the band from the expander fingers is performed by a release mechanism indicated generally at 101. This mechanism is best shown in FIGURES 14–18. Specifically, the release mechanism includes two vertical side shafts 102 and 103 extending generally along each side of opening 35. In the specific embodiment shown, these shafts are not disposed along precisely vertical lines, but rather are angulated slightly inwardly at the bottom.

Each of the vertical shafts 102 and 103 respectively carries an upper release finger 22 and 23 and a lower release finger 24 and 25. These fingers are secured to the shafts in any suitable manner, such as by means of set screws 104 which engage nuts 105 surrounding the shaft and extend through the end of a U-shaped channel section 106 formed at the lower end of the release fingers.

Each of the vertical shafts 102 and 103 is pivotally mounted in flanges 107–110 carried by divider wall 49 and extend forwardly therefrom in generally horizontal planes. A thrust bearing 111 and 112 is mounted upon each of the shafts beneath the lowermost flanges 109 and 110. A thrust and actuating arm assembly 113 and 114 is mounted at the uppermost end of each of the rods. As is best shown in FIGURE 14, each of the thrust and actuating assemblies comprises a washer 115 surrounding the shaft in engagement with one of the upper flanges, such as flange 107. A U-shaped arm member 116 is mounted above the washer and is secured to the shaft by means of a set screw 117 which passes through the arm and through a threaded nut 118 and engages the upper end of the shaft. Each of the arms 116 passes rearwardly through an opening formed in vertical divider plate 49.

Each of the shafts 102 and 103 is spring urged to a retracted position in which the fingers are disposed in a vertical plane parallel to divider plate 49 as is shown in FIGURE 10. This is accomplished by means of coil spring 120 and 121. Each of the coil springs is wrapped around one of the shafts 102, 103 and includes an arm 122, 123 in abutment with divider wall 49 and a second arm in engagement with actuating arm assembly 113.

Pivotal movement of shafts 102 and 103 in their retracted direction is limited, as is best shown in FIGURES 13 and 15, by the abutment of arms 116 with angle arms 124 and 125 pivotally mounted upon the rear surface of divider wall 49 as at 126 and 127. Outward pivotal movement of the angle arms is limited by stops 128 and 129 bolted to the rear surface of the divider wall.

The angle arms 124 and 125 also constitute part of the mechanism for shifting the release fingers outwardly at the end of the operating cycle to force the rubber band from the ends of the expander fingers 14–17. Specifically, as is shown in FIGURE 15, each of the angle arms 124, 125 includes a flange 130 and 139 formed on the arm not in engagement with arms 116 connected to the vertical shafts 102 and 103. In the retracted position of the release fingers, flanges 130 and 139 extend in a generally horizontal direction and are disposed for engagement with depending abutment screws 131 and 132 threaded into the ends of wing plate 99. These abutment screws are of a length such that they engage flanges 130 and 139 only after the expander fingers have been shifted to substantially their greatest opening.

At this point, actuator rod 18 and main pivot arm 68 have been shifted downwardly a major portion of their stroke. Further downward movement of actuator rod 18 and pivot arm 68 forces wing plate 99 downwardly to a point where abutment screws 131 and 132 abut flanges 130 and 139 of angle arms 124 and 125. Additional downward movement of the pivot arm, wing plate and abutment screws cause angle members 124 and 125 to be pivoted in such a manner that their upright portions are shifted inwardly toward block 65. The upper ends of these arms in turn cause arms 116 and shafts 102 and 103 to pivot in such a manner that the release fingers swing outwardly. It is to be understood that in their initial position the release fingers are disposed rearwardly of the rubber band carried by the expander fingers.

In the preferred embodiment, at the time that the release fingers start to pivot outwardly, the lower expander fingers 15 and 16 have passed just below the tips 133 and 134 of release fingers 24 and 25. At the same time, upper expander fingers 14 and 17 have reached a position just over the tips 135 and 136 of upper release fingers 22 and 23. As is best shown in FIGURE 14, the lower release fingers 24 and 25 are curved upwardly with the lower edges of these release fingers conforming generally to the arcs of movement of expander fingers 15 and 16. Similarly, the upper surface of upper release fingers 22 and 23 follows generally the arcs of movement of upper expander fingers 14 and 17.

During the final downward movements of the actuating rod 18 and main pivot arm 68, the expander fingers continue to shift apart, as is shown in FIGURE 14, and simultaneously the release fingers are pivoted outwardly. The release fingers thus force the band on the expander fingers off the free ends of the expander fingers and cause it to snap around the article 10 disposed within opening 35.

When the actuating rod 18 is freed to move upwardly by the removal of pressure from foot peddle 34, spring 73 pulls pivot arm 68 upwardly. The wing block 99 is initially shifted upwardly by the spring action of coil springs 120 and 121. These springs pivot shafts 102 and 103 so as to return the release fingers to their retracted position. As shafts 102 and 103 pivot, fingers 116 cause angle members 124 and 125 to pivot. The flanges 130 and 139 on these members force stop screws 131 and 132 and wing block 99 upwardly. After angle members 124 and 125 engage stops 128 and 129, movement of the wing block is temporarily halted. Pivot pin 81, which was shifted with the wing block during its initial movement, started to return the expander fingers to their retracted position as shown in FIGURE 13. However, the movement of these fingers is also temporarily arrested until the bottom surface 147 of the lost motion mechanism abuts cam sleeve 169. Thereafter, continued upward movement of pivot arm 68 carries cam sleeve 169, pin 81, slide block 94 and wing plate 99 upwardly. As pin 81 is shifted upwardly, the expander arms are retracted and slide block 94 is shifted under friction roller 95.

During final upward movement of the pivot arm 68, abutment screw 66 engages flange 61 of rocker lever 60 and pivots that rocker lever clockwise in FIGURE 15 to cause the yoke 51 and feed plate 21 to be shifted outwardly in the manner explained below. At this point, the tube of rubber bands 12 in feed chute 38 drops downwardly under their own weight onto shelf 47 so that the unit is ready for the next cycle of operation.

From the foregoing disclosure of the general principles of the present invention and the above detailed description of one preferred embodiment, those skilled in the art will readily contemplate various modifications which can be made in the machine without departing from the principles of the present invention. By way of example, one slightly modified rubber band applying machine is shown in a semi-diagrammatic manner in FIGURES 19 and 20. It is to be understood that the modification as there shown functions in generally the same manner as the preferred embodiment, except that the modified unit in FIGURES 19 and 20 is electrically power actuated.

The control for this unit, as shown in FIGURE 19, is provided by a push button 150. This push button can be manually depressed by the operator at the begining of an operating cycle, or alternatively, this initiating electrical control can be in the form of a pressure sensitive switch, photoelectric cell or the like, which is actuated by articles on a conveyor as they are fed to the band applying machine.

In any event, when switch 150 is closed, a solenoid 151 is energized. This solenoid is connected to an actuating rod 18a and when energized is effective to pull the actuating rod downwardly. The upper end of the actuating rod is secured to a main pivot arm 68a in the manner described previously. When rod 68a is shifted downwardly, it causes a yoke member 51a to be released to advance a feed finger 21a against the rubber band at the bottom of feed chute 38a in the manner explained above. Since the details of this portion of the mechanism are substantially identical with the preferred embodiment, it is considered unnecessary to repeat the details here.

As the feed plate 21a engages the rubber band, it forces the band over four expander fingers 14a–17a which are disposed in a horizontal row beneath the chute in the manner previously described. As the actuating rod 18a and pivot arm 68a continue to move downwardly, a lost motion mechanism 152 of the type described previously forces a pin 81a downwardly to cause the expander arms to be pivoted outwardly in the manner described above. The linkage for shifting these expander fingers is the same as that described previously and it is not considered necessary to repeat a detailed description of it at this point.

In the embodiment shown in FIGURES 19 and 20, however, there is no mechanical interconnection between the release mechanism 101a and the main pivot arm 68a as described in the previous embodiment. However, the release mechanism includes two shafts 102a and 103a which are spring urged to a position in which the four release fingers 22a–25a are disposed in a plane as described in connection with the preferred embodiment.

The shafts 102a and 103a are rotatably mounted upon the divider wall 49a in the manner previously described. In the modified embodiment of FIGURES 19 and 20, inward and outward pivotal movement of the release fingers is effected by means of a second solenoid 153. This solenoid is powered through a circuit including a limit switch 149. While limit switch 149 has been shown in FIGURE 19 as being actuated upon sufficient movement of shaft 68a, it is to be understood that the limit switch can physically be actuated in any manner whenever the expander fingers have reached a position in which they have substantially stretched the rubber band so that it is desired to release the rubber band from the fingers allowing it to snap over the article surrounded by the band.

As is shown in FIGURES 19 and 20, solenoid 153 includes an armature 154 which is pushed outwardly from the solenoid whenever the solenoid is energized. Armature 154 abuts an arm 155. This arm is rigidly secured to the lower end of shaft 103a as by means of bracket 156 and set screw 157. Arm 155 also carries a flange 158 which is pivotally secured to the end of a link 159. Link 159 is in turn pivotally joined to an arm 160. This arm is rigidly connected to the lower end of shaft 102a by means of a bracket 161 and a set screw 162.

It will be appreciated that when solenoid 153 is energized in response to movement of expander fingers 14a–17a, armature 154 is advanced. Its engagement with arm 155 causes shaft 103a to be rotated so that release fingers 23a and 25a are shifted outwardly. At the same time, the interconnection provided by link 159 causes shaft 102a to be rotated so that release fingers 22a and 24a are shifted outwardly. These release fingers force the rubber band from engagement with the expander fingers in the same manner explained above. The device is returned to its initial or starting position ready for the next cycle by releasing button 150 which deenergizes solenoid 151 and in turn causes deenergization of solenoid 153.

These and other modifications will suggest themselves to those skilled in the art. For example, an internal band supporting tube can be utilized in place of chute 38. The tube supports the bands relative to a shelf member and fingers with the lowermost band free in the same general manner as chute 38. Also, other forms of power actuators, such as pneumatic or hydraulic cylinders, can be utilized in place of solenoids 151 and 153. Accordingly, we desire to be limited only by the scope of the following claims.

Having described our invention, we claim:

1. A machine for applying elastic bands to articles, said machine comprising a chute for receiving a tube of adherent elastic bands, an expander mechanism comprising a plurality of band engaging expander fingers, means for shifting said expander fingers in a divergent relationship to stretch a band in engagement with said fingers so that the band defines an enlarged central opening, a feeding mechanism for sequentially feeding bands from said chute around said expander fingers, and a release mechanism for forcibly disengaging bands from said expander fingers.

2. A machine for applying elastic bands to articles, said machine comprising a chute for receiving a tube of adherent elastic bands, an expander mechanism comprising a plurality of band engaging expander fingers, means for shifting said expander fingers in a divergent relationship to stretch a band in engagement with said fingers so that the band defines an enlarged central opening, a feeding mechanism for sequentially feeding bands from said chute around said expander fingers, a release mechanism for forcibly disengaging bands from said expander fingers, and a reciprocating actuating member, said feeding mechanism, said expander mechanism and said release mechanism being operated in timed relationship in response to linear movement of said actuating member.

3. In an elastic band applying machine of the type including a chute for receiving a tube of adherent elastic bands, and an expander mechanism including a plurality of expander fingers for stretching said bands, the improvement which comprises means for feeding said bands from said chute to said expander fingers, said means comprising a shelf spaced from the end of the chute, a feeder blade, and means for advancing said blade intermediate the shelf and end of said chute, whereby said blade engages the endwise band in said chute and pivots said band over said expander fingers.

4. In an elastic band applying machine of the type including a chute for receiving a tube of adherent elastic bands, and an expander mechanism including a plurality of expander fingers for stretching said bands, the improvement which comprises means for feeding said bands from said chute to said expander fingers, said means comprising a shelf spaced from the end of the chute, a feeder blade, and means for advancing said blade intermediate the shelf and end of said chute, whereby said blade engages the endwise band in said chute and pivots said band over said expander fingers, said last named means comprising a spring urging said feeder blade toward said chute, and releasable restraining means for initially holding said blade in a position spaced from said bands and subsequently allowing said blade to move into engagement with said endwise band under the influence of said spring.

5. In an elastic band applying machine of the type adapted for use with a tubular assembly of oval bands, the tubular band assembly having a plurality of transverse slits defining individual bands, and an uncut portion parallel to the axis of the tube, the combination of a feeding mechanism for feeding the endwise band of the tubular assembly to an expander mechanism, the feeding mechanism including a blade and means forcing the blade against the periphery of the endmost band of said tubular assembly, the feeding blade engaging the portion of said periphery remote from the uncut strip, and a feed chute for holding said tubular assembly of bands in proper orientation relative to said feed blade, said feed chute being of oval cross section and being curved in a direction away from said feed plate.

6. In an elastic band applying machine of the type adapted for use with a tubular assembly of oval bands, the tubular band assembly having a plurality of transverse slits defining individual bands, and an uncut portion parallel to the axis of the tube, the combination of a feeding mechanism for feeding the endwise band of the tubular assembly to an expander mechanism, the feeding mechanism including a blade and means forcing the blade against the periphery of the endmost band of said tubular assembly, the feeding blade engaging the portion of said periphery remote from the uncut strip, and a feed chute for holding said tubular assembly of bands in proper orientation relative to said feed blade, said feed chute being of oval cross section, and a shelf member spaced from the lowermost end of said feed chute by a distance at least equal to the width of one of said bands, said feed blade being disposed to enter the space between the end of said feed chute and said shelf.

7. A machine for applying elastic bands to articles, said machine comprising means for supporting a tube of adherent elastic bands, feeding means for rotating the endwise band of said tube into a plane angulated relative to the adjacent band in said tube, and an expander mechanism, said expander mechanism comprising four fingers, means initially disposing said fingers in juxtaposition relative to one another, whereby said fingers receive and are embraced by the band rotated by said feed mechanism, means for shifting said fingers in relatively divergent paths, whereby said fingers stretch said band to form a large central opening, and a release mechanism for forcibly disengaging bands from said expander fingers.

8. A machine for applying elastic bands to articles, said machine comprising means for supporting a tube of adherent elastic bands, feeding means for rotating the endwise band of said tube into a plane angulated relative to the adjacent band in said tube, and an expander mechanism, said expander mechanism comprising four fingers, means initially disposing said fingers in juxtaposition relative to one another, whereby said fingers receive the band rotated by said feed mechanism, and means for shifting said fingers in relatively divergent paths, whereby said fingers stretch said band to form a large central opening, said last named means comprising four elongated arms carrying said fingers, stationary means pivotally mounting a first set of two of said arms, a reciprocating pivot pin connected to a second set of two of said arms remote from the fingers carried thereby, a first set of links pivotally connected to the second set of arms adjacent to the fingers carried thereby, and a second set of links interconnecting said first set of arms and said second set of arms, means for reciprocating said pivot pin, and a release mechanism for forcibly disengaging bands from said expander fingers.

9. In a machine for applying elastic bands to articles, said machine comprising storage means for supporting a tube of adherent elastic bands, an expander mechanism comprising a plurality of band engaging expander fingers, means for moving said expander fingers in a divergent relationship within a plane to stretch a band in embracing engagement with said fingers so that the band defines an enlarged central opening, a feeder mechanism for sequentially feeding bands from said storage means to said expander fingers, and a release mechanism for forcibly disengaging bands from said expander fingers, said release mechanism comprising at least one member shiftable in a plane transverse to the plane of movement of said expander fingers, means normally positioning said last named member spaced from a band carried by said expander fingers, and means shifting said one member against said elastic band to push said elastic band from contact with said expander fingers.

10. In a machine for applying elastic bands to articles, said machine comprising storage means for supporting a tube of adherent elastic bands, an expander mechanism comprising a plurality of band engaging expander fingers, means for shifting said expander fingers in a divergent relationship to stretch a band in engagement with said fingers so that the band defines an enlarged central opening, a feeder mechanism for sequentially feeding bands from said storage means to said expander fingers, and a release mechanism for forcibly disengaging bands from said expander fingers, said release mechanism comprising a plurality of release fingers, means pivotally supporting said release fingers, spring means normally urging said release fingers to a retracted position in which said release fingers are spaced from a band in engagement with said expander fingers, means for rotating said release fingers into engagement with said band and for forcing said band from contact with said expander fingers.

11. In a machine for applying elastic bands to articles, said machine comprising storage means for supporting a tube of adherent elastic bands, an expander mechanism comprising a plurality of band engaging expander fingers, means for shifting said expander fingers in a divergent relationship to stretch a band in engagement with said fingers so that the band lies in a plane and defines an enlarged central opening, a feeder mechanism for sequentially feeding bands from said storage means to said expander fingers, and a release mechanism for forcibly disengaging bands from said expander fingers, said release mechanism comprising two side shafts, means pivotally mounting said side shafts for rotation about the respective axes of said shafts, each of said shafts carrying upper and lower release fingers, spring means urging each of said shafts to a retracted position in which said release fingers are disposed generally in a plane spaced from the plane of a band carried by said expander fingers, and means for rotating said shafts to pivot said fingers against a band carried by said expander fingers, thereby forcing the band from contact with said fingers.

12. In a machine for applying elastic bands to articles, said machine comprising storage means for supporting a tube of adherent elastic bands, an expander mechanism comprising a plurality of band engaging expander fingers, means for shifting said expander fingers in a divergent relationship to stretch a band in engagement with said fingers so that the band lies in a plane and defines an enlarged central opening, a feeder mechanism for sequentially feeding bands from said storage means to said expander fingers, and a release mechanism for forcibly disengaging bands from said expander fingers, said release mechanism comprising two side shafts, means pivotally mounting said side shafts for rotation about the respective axes of said shafts, each of said shafts carrying upper and lower release fingers, spring means urging each of said hafts to a retracted position in which said release fingers are disposed generally in a plane spaced from the plane of a band carried by said expander fingers, and means for rotating said shafts to pivot said fingers against a band carried by said expander fingers, thereby forcing the band from contact with said fingers, said last named means comprising fingers mounted upon each of said shafts and extending radially therefrom, angle members in abutment with said fingers and means pivoting said angle members to rotate said fingers.

13. A machine for applying elastic bands to articles, said machine comprising a chute for receiving a tube of adherent elastic bands, an expander mechanism comprising a plurality of band engaging expander fingers, means for shifting said expander fingers in a divergent relationship to stretch a band in engagement with said fingers so that the band defines an enlarged central opening, a feeding mechanism for sequentially feeding bands from said chute around said expander fingers, and a release mechanism for forcibly disengaging bands from said expander fingers, a first solenoid for actuating said feeding mechanism and said expander mechanism, and a second solenoid for actuating said release mechanism.

14. In an elastic band applying machine of the type including a generally vertical chute for receiving a tube of adherent elastic bands, and an expander mechanism including a plurality of expander fingers for stretching said bands, the improvement which comprises means for feeding said bands from said chute onto said expander fingers, said means comprising a shelf disposed below and spaced from the end of the chute, said expander mechanism including means for bringing said fingers into horizontal juxtaposition below said shelf, a feeder blade, and means for advancing said blade intermediate the shelf and end of said chute, whereby said blade engages the endwise band in said chute and pivots said band downwardly over said expander fingers.

15. A machine for applying elastic bands to articles, said machine comprising a chute for receiving a tube of adherent elastic bands, an expander mechanism comprising a plurality of band engaging expander fingers, means for shifting said expander fingers in a divergent relationship to stretch a band in engagement with said fingers so that the band defines an enlarged central opening, a feeding mechanism for sequentially feeding bands from said chute around said expander fingers, and a release mechanism for forcibly disengaging bands from said expander fingers, a first power means for actuating said feeding mechanism and said expander mechanism, and a second power means for actuating said release mechanism.

16. A machine for applying elastic bands to articles, said machine comprising a vertical chute for supporting a tube of adherent elastic bands, feeding means for rotating the endwise band of said tube into a vertical plane, an expander mechanism, said expander mechanism comprising a first set of two arms and a second set of two arms, each of said arms carrying a horizontally extending expander finger at the free end thereof, each of said first set of arms including an elongated section and a short section angulated relative to said elongated section, stationary means pivotally mounting the first set of two arms at the junction of said short section and elongated section, said arms being movable in a vertical plane, a vertically reciprocating pivot pin connected to each of the arms of said second set at the ends of said arms remote from the fingers carried thereby, a first set of depending links, stationary pivot means pivotally supporting the upper ends of said links, means pivotally connecting the lower ends of said links to the second set of arms adjacent to the fingers carried thereby, a second set of links respectively interconnecting the short section of each of said first set of arms with the one of the second set of arms remote from the arm of said first set to which said link is connected, means for reciprocating said pivot pin to shift said fingers from a retracted position in which said fingers are horizontally aligned to an expanded position in which said fingers occupy the corners of a quadrilateral, and a release mechanism for forcibly disengaging bands from said expander fingers.

References Cited by the Examiner

UNITED STATES PATENTS

| | | | |
|---|---|---|---|
| 893,748 | 7/08 | McCarty | 100—2 |
| 935,803 | 3/11 | Hodgkinson | 29—235 X |
| 1,508,258 | 9/24 | Sikma | 100—9 |
| 2,236,936 | 4/41 | Camp | 100—9 |
| 2,447,474 | 8/48 | Hammond | 29—235 X |
| 2,599,427 | 6/52 | Bellingher | 100—2 |

FOREIGN PATENTS 747,347   9/44   Germany.

WALTER A. SCHEEL, *Primary Examiner.*